United States Patent
Hsu

(10) Patent No.: US 7,986,798 B2
(45) Date of Patent: Jul. 26, 2011

(54) SIGNAL GENERATING MODULE

(75) Inventor: Ti-Ming Hsu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 1167 days.

(21) Appl. No.: 11/686,362

(22) Filed: Mar. 15, 2007

(65) Prior Publication Data

US 2008/0112579 A1    May 15, 2008

(30) Foreign Application Priority Data

Sep. 28, 2006 (TW) ................ 95135922 A

(51) Int. Cl.
*H03G 3/00* (2006.01)
(52) U.S. Cl. ......... 381/109; 381/104; 381/105; 381/107
(58) Field of Classification Search .......... 381/104–109, 381/120
See application file for complete search history.

(56) References Cited

U.S. PATENT DOCUMENTS

| | | | | |
|---|---|---|---|---|
| 2,002,443 A | * | 5/1935 | Thomas | ......................... 455/353 |
| 3,122,673 A | * | 2/1964 | Dutton et al. | ................. 315/377 |
| 5,513,268 A | * | 4/1996 | Bironas et al. | ................. 381/109 |
| 2005/0244021 A1 | * | 11/2005 | Rosenthal et al. | ............ 381/312 |
| 2006/0210105 A1 | * | 9/2006 | Liao | .............................. 381/334 |

FOREIGN PATENT DOCUMENTS

TW         454891         9/2001

* cited by examiner

*Primary Examiner* — Devona E Faulk
*Assistant Examiner* — Disler Paul
(74) *Attorney, Agent, or Firm* — Jianq Chyun IP Office

(57) ABSTRACT

A signal generating module for an electronic apparatus is provided. The signal generating module includes a processor, a roller, a resistant film, a conducting member, a first lead and a second lead. The roller has a rotary center and is rotably connected to the electronic apparatus thereby. The conducting member is connected to the rotary center to rotate together with the roller. The conducting member has an end including a conducting contact point. The conducting contact point is configured to rotate around the rotary center along a motion path accompanying the rotation of the roller, wherein the motion path is disposed at a first area of the resistant film. The first lead is coupled to the processor and in contact with the resistant film. The second lead is coupled to the processor, and coupled to the conducting member via the rotary center.

14 Claims, 2 Drawing Sheets

SIGNAL GENERATING MODULE

CROSS-REFERENCE TO RELATED APPLICATION

This application claims the priority benefit of Taiwan application serial no. 95135922, filed Sep. 28, 2006. All disclosure of the Taiwan application is incorporated herein by reference.

BACKGROUND OF THE INVENTION

1. Field of the Invention

The present invention relates to a signal generating module, and more particularly to a signal generating module adapted for adjusting a signal emitting intensity.

2. Description of Related Art

Recently, as notebook computers are more widely used, consumers are paying more attentions to additional audio and video functions thereof, which enables some types of notebook computers to function as general family audio and video apparatuses in addition to their original functions. Therefore, consumers pay attention not only to the size of displays and performance of speakers but also to the convenience of sound volume control of notebook computers.

Typically, a notebook computer controls the sound volume of a speaker with an aid of software, which is inconvenient for users. Therefore, some notebook computers apply variable resistors to control the sound volume. However, the sound volume set by variable resistor does not relates to that set by software, which requires adjustment of the variable resistor and software interface in sequence to obtain the maximum sound volume. Additionally, a variable resistor may malfunction due to poor contact after long time operation.

Taiwan patent publication No. 454891 discloses a digital sound volume control knob for a notebook computer including a primary control element and an auxiliary control element. The primary control element includes at least one spring leaf and the auxiliary control element includes a plurality of chips. The relative rotation or translation between the primary control element and the auxiliary control element allows the spring leaf to contact with different chips to generate different electrical signals so as to control the sound volume.

Since the sound volume control method of the sound volume control knob according to the above patent belongs to digital control, the digital sound volume control knob may synchronize with the sound volume control by software. In other words, while a user rotates the digital sound volume control knob, the sound volume settings by software is also adjusted accordingly, which may facilitate the operation of the sound volume controlling. Therefore, a user may adjust a speaker to the maximum sound volume through the digital sound volume control knob or software interface.

SUMMARY OF THE INVENTION

Accordingly, the present invention is directed to a signal generating module including a roller. The roller can be driven by external force to rotate, according to which the signal generating module generates signals.

The present invention is also directed to a signal generating module adapted for adjusting an emitting intensity of a signal emitting terminal.

The present invention is also directed to a signal generating module adapted for a sound volume adjusting module for adjusting the sound volume of a speaker.

For achieving the foregoing objects and others, the present invention provides a signal generating module, adapted for an electronic apparatus. The signal generating module includes a processor, a roller, a resistant film, a conducting member, a first lead and a second lead.

The processor is fixedly connected to the electronic apparatus. The roller has a rotary center and is rotably connected to the electronic apparatus thereby. The resistance film is connected to the electronic apparatus. The conducting member is connected to the rotary center so as to rotate together with the rotary center. The conducting member has an end including a conducting contact point. The conducting contact point is configured to rotate around the rotary center along a motion path accompanying the rotation of the roller, wherein the motion path is located at a first area of the resistant film. The first lead is fixedly connected to the electronic apparatus, coupled to the processor, and being in contact with the resistant film. The second lead is securely connected to the electronic apparatus, coupled to the processor, and coupled to the conducting member via the rotary center.

When the roller is driven by an external force to rotate, the conducting contact point is driven to move on a surface of the resistant film, and therefore the processor generates a first signal by evaluating signals transmitted from the first lead and the second lead.

According to an embodiment of the present invention, the foregoing signal generating module further includes a connecting unit, by which the second lead is connected to the rotary center.

According to an embodiment of the present invention, the foregoing conducting member and the connecting unit are distributed at two ends of the rotary center respectively.

According to an embodiment of the present invention, the foregoing first lead or second lead are coupled to a grounded terminal of either the processor or the electronic apparatus.

According to an embodiment of the present invention, the foregoing signal generating module further includes a third lead fixedly connected to the electronic apparatus and coupled to the processor, and in contact with the resistant film. When the roller is driven by an external force to rotate causing the conducting contact point to move on the surface of the resistant film, the processor generates a second signal by evaluating signals transmitted from the second lead and the third lead.

According to an embodiment of the present invention, the foregoing second signal is adapted for confirming the first signal or substituting the first signal.

According to an embodiment of the present invention, the foregoing second lead or the foregoing third lead is coupled to a grounded terminal of the processor or the electronic apparatus.

According to an embodiment of the present invention, the foregoing resistant film further includes a second area without overlapping the first area, wherein the motion path is disposed in the first area and the second area. When the conducting contact point contacts the second area, the processor generates a reset signal by evaluating signals transmitted from the first lead and the conducting contact point.

According to an embodiment of the present invention, the foregoing resistant film has an annular shape, and the foregoing first area and second area are two arcuate sections of the resistant film.

According to an embodiment of the present invention, the foregoing signal generating module further includes a circuit board, on which the processor, the roller, the resistant film, the first lead, and the second lead are mounted.

According to an embodiment of the present invention, the foregoing circuit board is a motherboard of the electronic apparatus.

According to an embodiment of the present invention, the foregoing signal generating module further includes a signal emitting terminal coupled to the processor for adjusting a signal emitting intensity.

According to an embodiment of the present invention, the foregoing signal emitting terminal further includes an amplification circuit and a speaker, and the signal emitting intensity, for example, is a sound volume.

Accordingly, the signal generating module according to the present invention drives the conducting contact point to move on the resistant film by a rotated roller driven by external forces. The motion of the conducting contact point on the resistant film changes the resistance between the first lead and the conducting contact point, or the resistance between the third lead and the conducting contact point. Therefore, the signal generating module can generate signals by changing resistance in such a way, and combine with digital control circuits to adjust signal emitting intensity.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
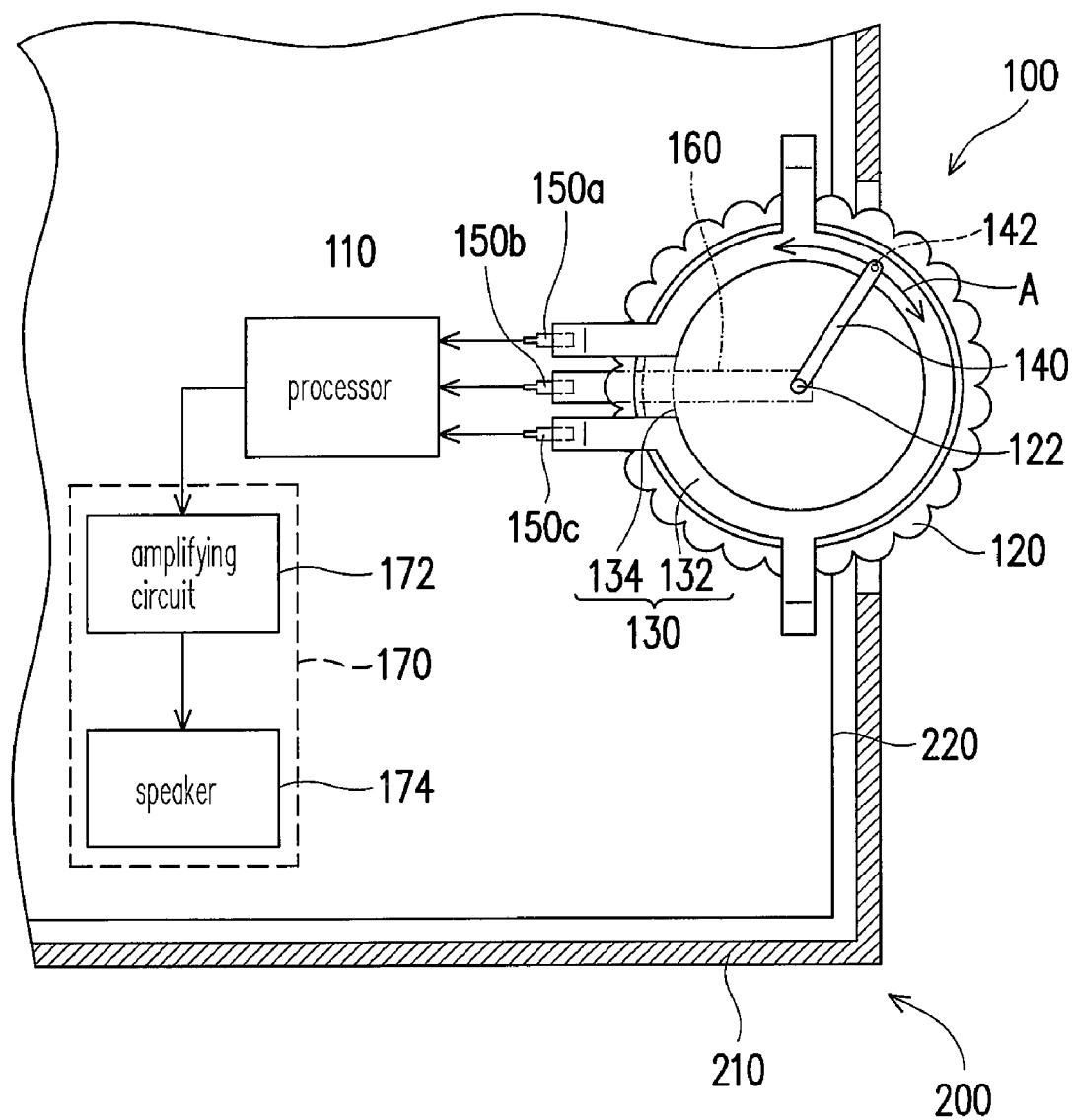
FIG. 1 is a schematic diagram illustrating a signal generating module according to an embodiment of the present invention employed in an electronic apparatus.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram illustrating a signal generating module according to an embodiment of the present invention employed in an electronic apparatus. Referring to FIG. 1, the signal generating module 100 is adapted for an electronic apparatus 200, e.g., a notebook computer, a personal digital assistant (PDA), or other electronic devices. The electronic apparatus 200 includes a housing 210 and a circuit board 220 securely connected to the housing 210. The circuit board 220, for example, is a mother board, a printed circuit board (PCB), or other kinds of boards having circuits distributed thereon.

The signal generating module 100 includes a processor 110, a roller 120 and a resistant film 130. According to the present embodiment, the processor 110 and the resistant film 130 are securely connected to the circuit board. The roller 120 includes a rotary center 122, by which the roller 120 is rotably connected to the circuit board 220. The roller is partially exposed out from the housing 210, so as to allow a user to apply a force thereon to rotate the roller 120 thereby. However, in other embodiments of the present invention, the roller 120 can also be rotably connected to the housing or other parts of the electronic apparatus 200, and the resistant film 130 can also be fixedly connected to the housing 210 or other parts of the electronic apparatus 200.

The signal generating module 100 further includes a conducting member 140. The conducting member 140 is connected to the rotary center 122 so as to rotate together with the roller 120. The conducting member 140 has an end including a conducting contact point 142. The conducting contact point 142 is configured to rotate around the rotary center 122 along a motion path A accompanying the rotation of the roller 120, wherein the motion path A is located at a first area 132 of the resistant film 130. The first area 132 for example can be made of carbon or any other materials having certain resistance adapted for operation of the signal generating module 100.

The roller 120 and the conducting member 140 are disposed at two opposite sides of the resistant film 130, respectively. For example, according to the present embodiment, the roller 120 is positioned at one side of the resistant film 130 adjacent to the circuit board 220, and the conducting member 140 at the other side of the resistant film 130 away from the circuit board 220. However, in another embodiment of the present invention, the roller 120 can also be positioned at one side of the resistant film 130 away from the circuit board 220, and the conducting member 140 at the other side of the resistant film 130 adjacent to the circuit board 220. Further, the roller 120 and the conducting member 140 can also be positioned at a same side of the resistant film 130 either adjacent to or away from the circuit board 220. For example, according to another embodiment of the present invention, the roller 120 and the conducting member 140 can be both positioned either at one side of the resistant film 130 adjacent to the circuit board 220, or at the other side of the resistant film 130 away from the circuit board 220.

The signal generating module 100 further includes a first lead 150a, and a second lead 150b. The first lead 150a is securely connected the circuit board 220, and coupled to the processor, and in contact with the resistant film 130. The second lead 150b is securely connected to the circuit board 220, and coupled to the processor 110, and coupled to the conducting member 140 via the rotary center 122.

According to an embodiment of the present invention, the signal generating module 100 further includes a connecting unit 160 electrically conductive. The rotary center 122 is electrically conductive, and includes two opposite ends. One end of the rotary center 122 is connected to the second lead 150b via the conducting device 160, and the other end is connected to the conducting member 140. As such, the conducting member 140 and the connecting unit 160 are disposed at two opposite ends of the rotary center 122. In more details, the conducting member 140 is located at one side of the resistant film 130 away from circuit board 220, and the connecting unit 160 is located at the other side of the resistant film 130 adjacent to the circuit board 220. However, in other embodiment of the present invention, the conducting member 140 and the connecting unit 160 can be located at a same side of the resistant film 130 adjacent to the circuit board 220. Further, in the present embodiment, the conducting member 140 and the connecting unit 160 may be disposed at two opposite sides of the roller 120, respectively.

It is to be noted that the present invention is not subject to limit the circuit board 220 as a certain part of the electronic apparatus 200. In other embodiments of the present invention, the circuit board 220 can also be a part of the signal generating module 100, wherein the processor 110, the roller 120, the resistant film 130, the first lead 150a, and the second 150b are installed on the circuit board 220.

In the present embodiment, when the roller 120 is driven by an external force to rotate so as to drive the conducting contact point 142 moving on a surface of the resistant film 130, the processor 110 generates a first signal by evaluating signals transmitted from the first lead 150a and the second lead 150b.

The signal generating module 100 further includes a signal emitting terminal 170 coupled to the processor 110, capable of adjusting a signal emitting intensity according to the foregoing first signal. For example, according to the embodiment, when the conducting contact point 142 as shown in FIG. 1 rotates anticlockwise along the motion path A so that the resistance between the conducting contact point 142 and the first lead 150a gradually decreases, the first signal generated by the processor 110 increases the signal emitting intensity, and when the conducting contact point 142 rotates clockwise along the motion path A so that the resistance between the conducting contact point 142 and the first lead 150a gradually increases, the first signal generated by the processor 110 decreases the signal emitting intensity.

However, in other embodiment of the present invention, when the conducting contact point 142 of FIG. 1 rotates anticlockwise along the motion path A so that the resistance between the conducting contact point 142 and the first lead 150a gradually decreases, the first signal generated by the processor 110 may decrease the signal emitting intensity, and when the conducting contact point 142 rotates clockwise along the motion path A so that the resistance between the conducting contact point 142 and the first lead 150a gradually increases, the first signal generated by the processor 110 increases the signal emitting intensity.

Further, the signal generating module 100 according to the present embodiment drives the conducting contact point 142 to move on the resistant film 130 by the roller 120 is driven by external forces to rotate. Therefore, the movement of the conducting contact point 142 changes the resistance between the first lead 150a and the conducting contact point 142. In such a way, the signal generating module 100 generates signals according to the change of the resistance, and adjusts the signal emitting intensity when facilitated with a digital control circuit.

According to the present embodiment, the signal emitting terminal 170 may include an amplifying circuit 172 and a speaker 174, and the signal emitting intensity for example is a sound volume. A user may increase or decrease the sound volume of the speaker 174 by rotating the roller 120 in anticlockwise or clockwise directions. However, in other embodiments of the present invention, the signal emitting terminal 170 can also be a display or other types of signal emitting devices, and the signal emitting intensity can also be for example brightness of images provided by the display or other kinds of signal emitting intensities.

Because the signal generating module 100 is adapted for facilitating other digital control circuit or software to adjust the sound volume, the signal generating module 100 can be synchronized with the software of the electronic apparatus 200 to control the sound volume. That means when the user adjusts the sound volume by rotating the roller 120, the setting of the software about the sound volume is adjusted accordingly. Thus, the adjustment of the sound volume can be relatively simpler.

The signal generating module 100 further includes a third lead 150c. The third lead 150c is securely connected to the circuit board 220, and coupled to the processor 110, and in contact with the resistant film 130. When the roller 120 is driven to rotate by an external force so as to drive the conducting contact point 142 to move on a surface of the resistant film 130, the processor 110 generates a second signal by evaluating signals transmitted from the second lead 150b and the third lead 150c. The second signal is adapted for confirming the first signal or substituting for the first signal. For example, the second signal can substitute the first signal to increase or decrease the signal emitting intensity.

According to the present embodiment, the second lead 150b is coupled to a grounded terminal of the processor 110 or the electronic apparatus 200. However, in other embodiments of the invention, it can also be the first lead 150a and the third lead 150c that are coupled to a ground terminal of the processor 110 or the electronic apparatus 200.

According to an embodiment of the present invention, the resistant film 130 is configured to have an annular shape further including a second area 134. The second area 134 and the first area 132 are two arcuate sections of the resistant film 130, and are not overlapped on one another. The motion path A is disposed at the first area 132 and the second area 134.

Figure 2:
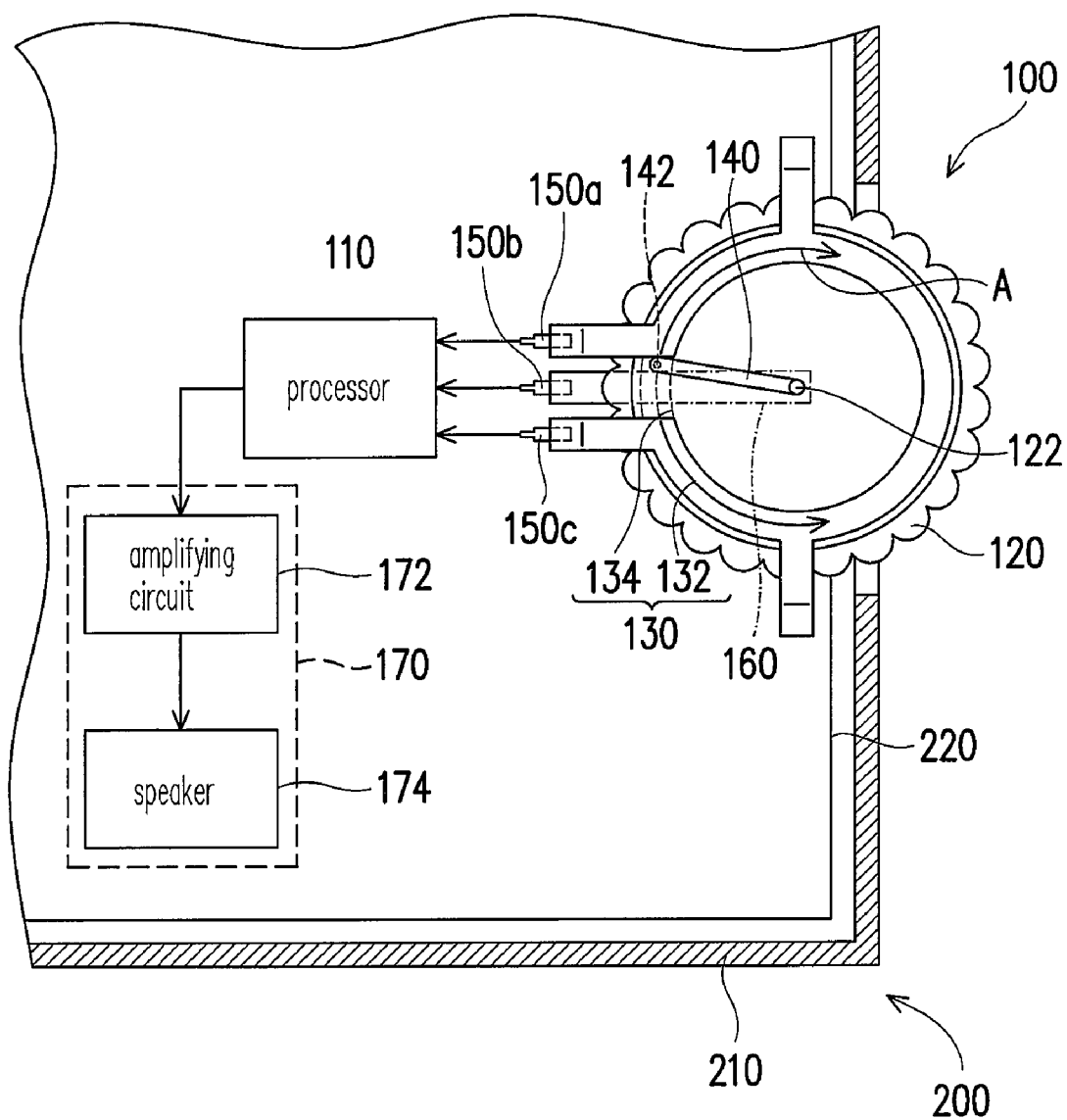
FIG. 2 is a schematic diagram illustrating a conducting contact point of the signal generating module of FIG. 1 in contact with a second area.

FIG. 2 is schematic diagram illustrating a conducting contact point of the signal generating module of FIG. 1 in contact with a second area. Referring to FIG. 2, when the conducting contact point 142 contacts the second area 134, the processor 110 generates a reset signal by evaluating signals transmitted from the first lead 150a and the conducting contact point 142. For example, in the embodiment, the second area 134 is a void space containing air. The conducting contact point 142 rotates anticlockwise from the position shown in FIG. 1 to the position shown in FIG. 2, and at the exact instant when the conducting contact point 142 get in touch with the second area 134, the processor 110 can easily learn a sudden increase of the resistance between the first lead 150a and the conducting contact point 142, and thus generates a reset signal.

The reset signal is adapted for coincidence of the first signal in adjusting the signal emitting intensity before and after the conducting contact point 142 passing the second area 134. For example, when the conducting contact point 142 rotates anticlockwise from the position of FIG. 1, the resistance between the first lead 150a and the conducting contact point 142 starts to decrease, accordingly the processor 110 generates the first signal for increasing the signal emitting intensity. When the conducting contact point 142 continuously rotates anticlockwise to the second area 134, the processor 110 generates a reset signal.

By continuous anticlockwise rotation, the conducting contact point 142 will reach the first area 132 again, and thereafter the conducting contact point 142 anticlockwise rotates at the first area 132, during which the resistance between the first lead 150a and the conducting contact point 142 would start to increase. Without a reset signal, the signal emitting intensity would decrease when the resistance increases. However, in the current embodiment, although the resistance increases at that moment, the first signal increases the signal emitting intensity because of the reset signal. Accordingly, in the current embodiment, before or after the conducting contact point 142 anticlockwise passing the second area 134, the signal emitting intensity consistently increases.

It is to be noted that, the present invention is not to limit the second area 134 as a void space. In other embodiments of the present invention, the second area 134 can also be constituted of material with very low electrical resistance, e.g., metal. In such a way, when the conducting contact point 142 reaches the second area 134, the resistance between the conducting contact point 142 and the first lead 150a approaches to zero, so as to have the processor 110 to generate a reset signal. Further, it is to be noted that the present invention does not limit the resistant film to be annular shaped. In other embodiments of the present invention, the resistant film 130 may have any other shapes suitable for the signal generating module 100 according to the embodiment of the present invention. Furthermore, in other embodiments of the present invention, the processor 110 can also generates the reset signal by evaluating signals transmitted from the third lead 150c and the conducting contact point 142.

In summary, in the signal generating module according to the present invention, the rotated roller is driven by external forces to move the conducting contact point on the resistant film. The motion of the conducting contact point on the resistant film changes the resistance between the first lead and the conducting contact point, or the resistance between the third lead and the conducting contact point. Therefore, the signal generating module can generate signals by changing resistance in such a way, and combine with digital control circuits to adjust signal emitting intensity.

Further, because the signal generating module is adapted for facilitating other digital control circuit or software to adjust the sound volume, the signal generating module can be synchronized with the software of the electronic apparatus to control the sound volume. In other words, when the user adjusts the sound volume by rotating the roller, the setting of the software about the sound volume is adjusted accordingly. Thus, the adjustment of the sound volume can be relatively simpler.

Furthermore, the signal generating module does not use a conventional variable resistor to adjust sound volume, so that problems caused by bad contact of the variable resistor after long time operation can be effectively avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A signal generating module, for an electronic apparatus, comprising:
   a processor, connected to the electronic apparatus;
   a roller, having a rotary center and being rotably connected to the electronic apparatus;
   a resistance film, connected to the electronic apparatus;
   a conducting member, connected to the rotary center to rotate together with the rotary center, wherein an end of the conducting member comprises a conducting contact point to rotate around the rotary center along a motion path accompanying the rotation of the roller, and wherein the motion path is located at a first area of the resistant film;
   a first lead, connected to the electronic apparatus, coupled to the processor, and being in contact with the resistant film; and
   a second lead, connected to the electronic apparatus, coupled to the processor, and coupled to the conducting member via the rotary center,
   wherein when the roller is driven to rotate by an external force, the conducting contact point is driven to move on a surface of the resistant film, and the movement of the conducting contact point changes a resistance between the first lead and the conducting contact point, and therefore the processor generates a first signal by evaluating signals transmitted from the first lead and the second lead according to the change of the resistance.

2. The signal generating module according to claim 1, further comprising a connecting unit for connecting the second lead to the rotary center.

3. The signal generating module according to claim 2, wherein the conducting member and the connecting unit are disposed at two ends of the rotary center respectively.

4. The signal generating module according to claim 1, wherein the first lead or second lead are coupled to a grounded terminal of either the processor or the electronic apparatus.

5. The signal generating module according to claim 1, further comprising:
   a third lead, connected to the electronic apparatus, coupled to the processor, and being in contact with the resistant film, wherein when the roller is driven by an external force to rotate to move the conducting contact point on the surface of the resistant film, the processor generates a second signal by evaluating signals transmitted from the second lead and the third lead.

6. The signal generating module according to claim 5, wherein the second signal is adapted for confirming the first signal or substituting the first signal.

7. The signal generating module according to claim 5, wherein the second lead or the third lead is coupled to a grounded terminal of the processor or the electronic apparatus.

8. The signal generating module according to claim 1, wherein the resistant film further comprises a second area that does not overlap the first area, and the motion path is disposed in the first area and the second area, and wherein when the conducting contact point contacts the second area, the processor generates a reset signal by evaluating signals transmitted from the first lead and the conducting contact point.

9. The signal generating module according to claim 8, wherein the resistant film has an annular shape, and the first area and second area are two arcuate sections of the resistant film.

10. The signal generating module according to claim 1, further comprising a circuit board, on which the processor, the roller, the resistant film, the first lead, and the second lead are mounted.

11. The signal generating module according to claim 1, wherein the circuit board is a mother board of the electronic apparatus.

12. The signal generating module according to claim 1, further comprising a signal emitting terminal coupled to the processor for adjusting a signal emitting intensity.

13. The signal generating module according to claim 12, wherein the signal emitting terminal further comprises an amplification circuit and a speaker.

14. The signal generating module according to claim 12, wherein the signal emitting intensity is a sound volume.

* * * * *